L. G. RILEY.
CONTROLLER FOR ELECTRIC MOTORS.
APPLICATION FILED NOV. 8, 1911. RENEWED DEC. 24, 1914.

1,157,904.

Patented Oct. 26, 1915.
4 SHEETS—SHEET 2.

WITNESSES:

INVENTOR

BY

ATTORNEY

L. G. RILEY.
CONTROLLER FOR ELECTRIC MOTORS.
APPLICATION FILED NOV. 8, 1911. RENEWED DEC. 24, 1914.

1,157,904. Patented Oct. 26, 1915.

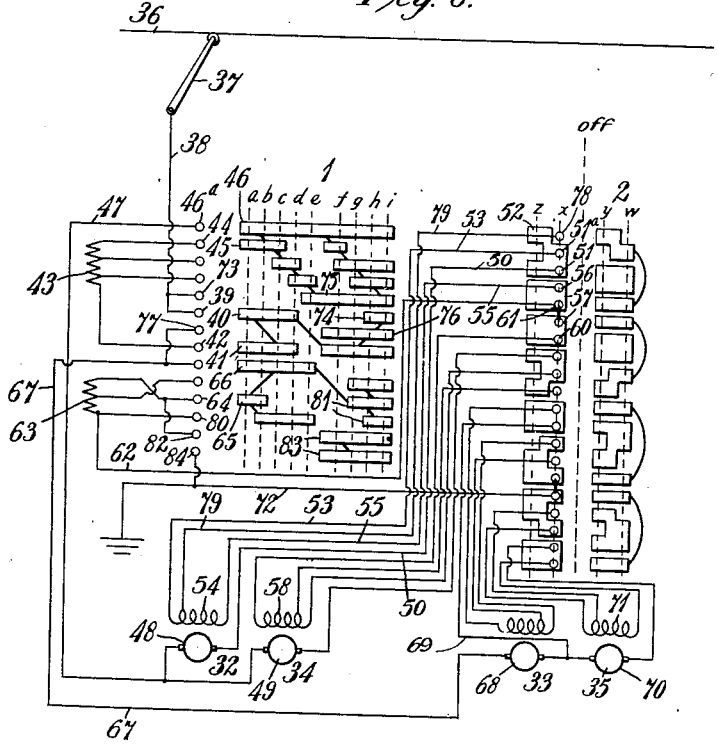

UNITED STATES PATENT OFFICE.

LYNN G. RILEY, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROLLER FOR ELECTRIC MOTORS.

1,157,904.  Specification of Letters Patent.  Patented Oct. 26, 1915.

Application filed November 8, 1911, Serial No. 659,201. Renewed December 24, 1914. Serial No. 878,941.

*To all whom it may concern:*

Be it known that I, LYNN G. RILEY, a citizen of the United States, and a resident of Wilkinsburg, in the county of Allegheny and State of Pennsylvania, have invented a new and useful Improvement in Controllers for Electric Motors, of which the following is a specification.

My invention relates to systems and apparatus for the control of electric motors and it has special reference to such systems and apparatus as are adapted for use with a plurality of railway motors which are governed in accordance with the usual series-multiple method.

It is sometimes desirable to operate railway vehicles at speeds which are somewhat higher than the ordinary full-multiple speed, and I propose to accomplish this result without detracting from the efficiency of the system or complicating the controller.

According to a more limited aspect of my invention, I provide special control contact segments on the usual reversing drum of a railway motor controller, which are adapted to exclude and open-circuit a portion of the series field magnet windings of the motors, the main control drum and the reversing drum being interlocked in such manner that it is impossible to weaken the motor fields until the usual full-multiple notch of the controller has been reached. An additional notch is provided so that a continuing movement of the controller handle, after the full-multiple position is reached, effects the necessary adjustment of the reversing drum.

Figure 1:
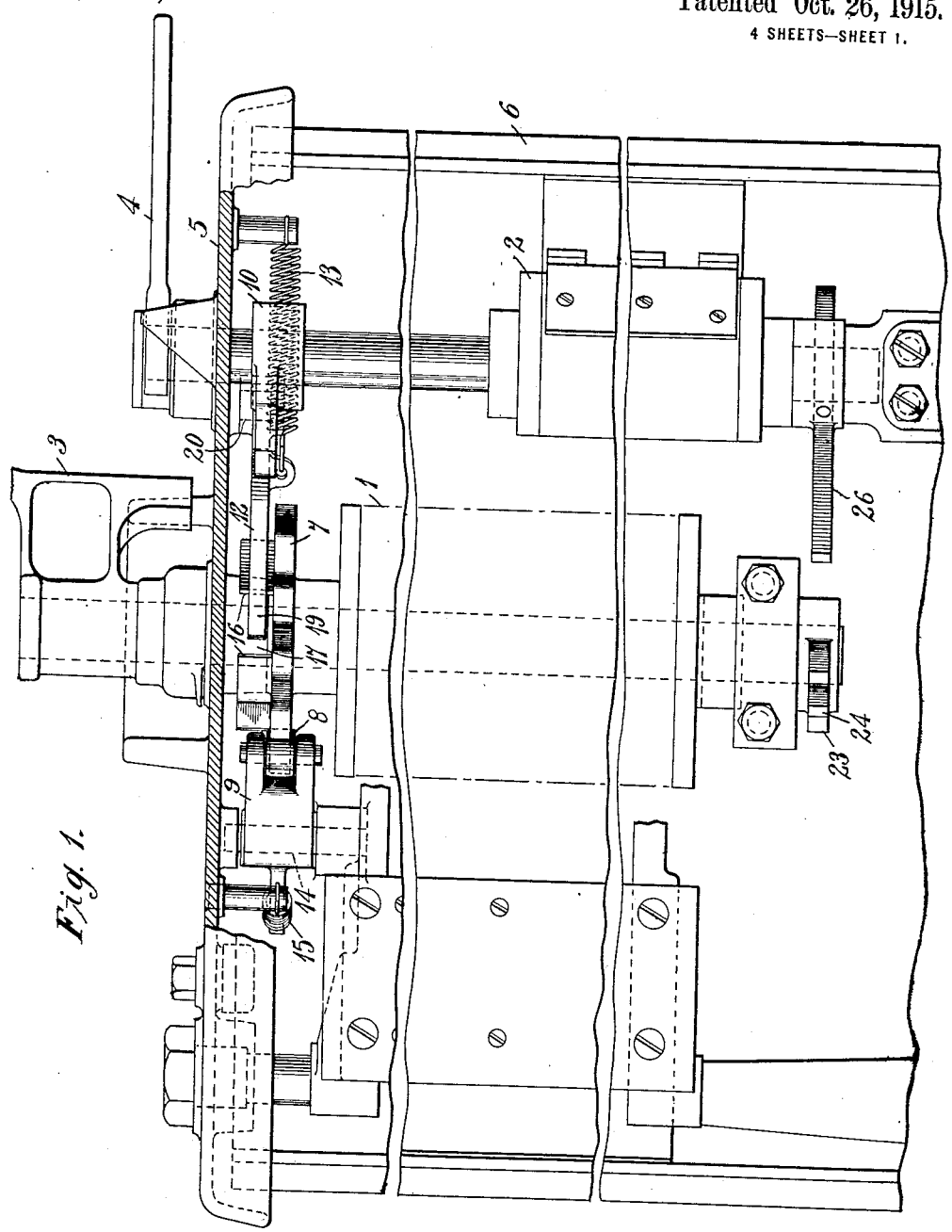
Figure 2:
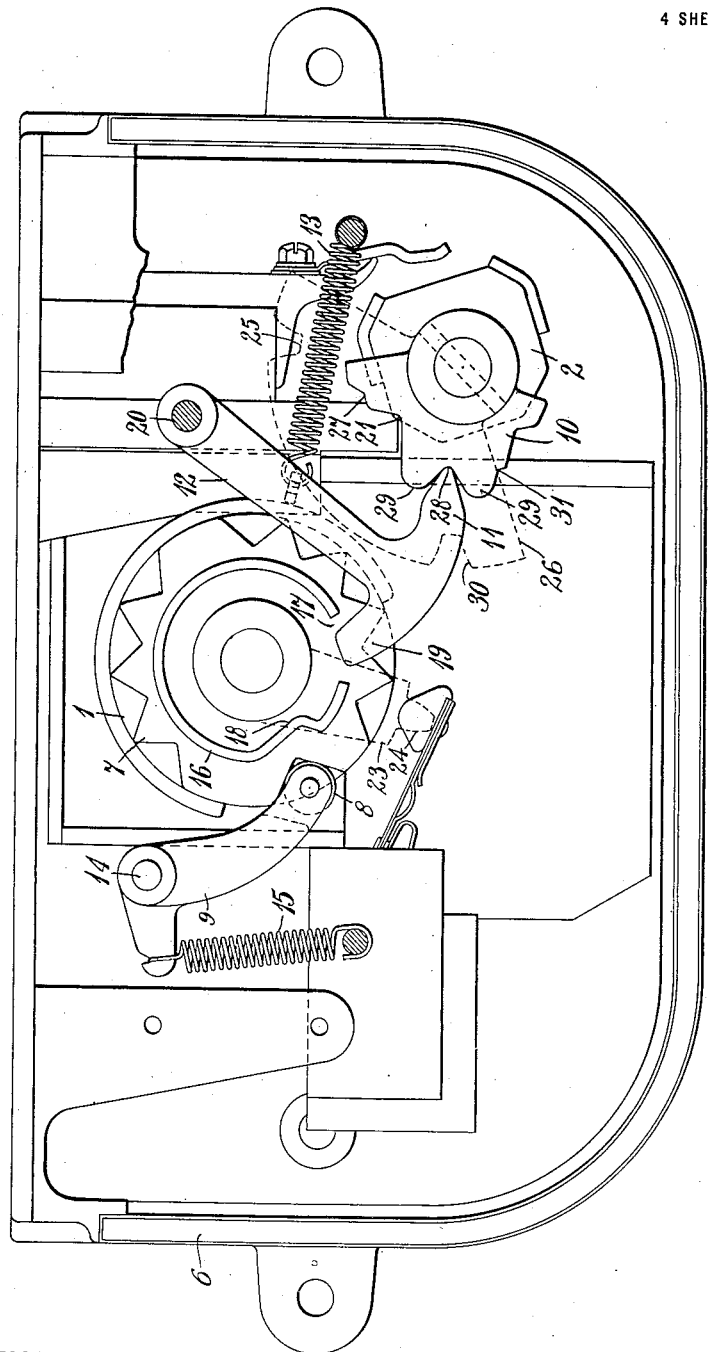
Figure 3:
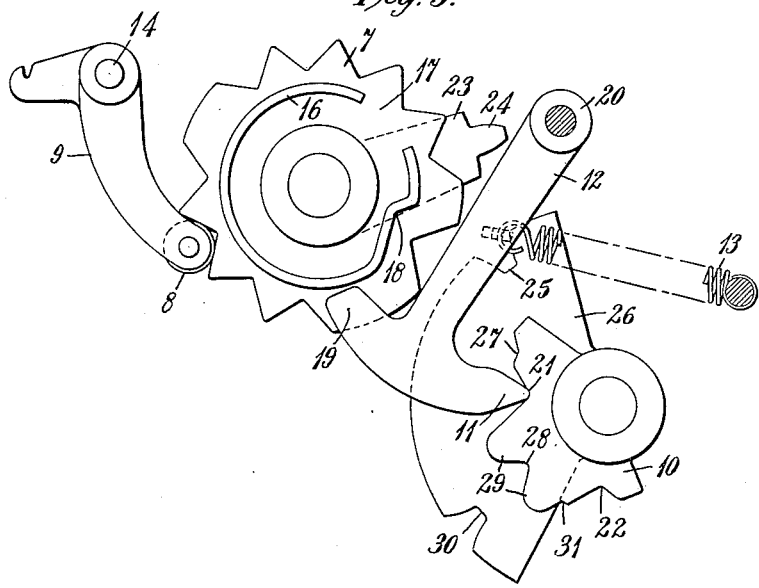
Figure 4:
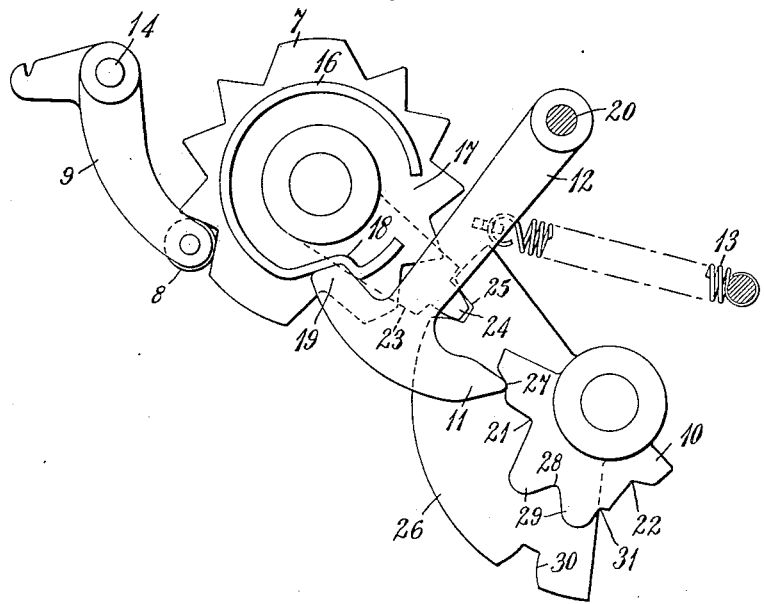

Figure 1 of the accompanying drawing is an elevation, and Fig. 2 is a plan view illustrating the interlocking mechanism of a controller constructed in accordance with my invention. Figs. 3, 4 and 5 are detail views illustrating the interlocking mechanism and the accentuating devices of the controller shown in Figs. 1 and 2 for various positions of the controller handle. Fig. 6 is a diagrammatic view of a control system embodying my invention, the contact segments on the main and reversing drums of the controller being developed into a single plane.

Referring to Figs. 1 to 5 of the drawings, the controller here shown comprises a main, voltage or resistance-controlling drum 1, a reversing drum 2, operating levers 3 and 4 for the respective drums, the usual top plate 5 and an inclosing casing 6. The drums are rotatively mounted in the usual manner and the main drum is provided with a star wheel 7, having a notched periphery which is engaged by the roller 8 of a pawl 9. The reversing drum 2 is provided with a star wheel or cam 10 having a notched periphery against which a projection 11 of a pawl 12 is held by a spring 13. The pawl 9 is pivotally supported on a pin 14 and is bell crank in form, being held in position to engage the notches of the star wheel 7 by means of a spring 15.

The star wheel 7 is provided with an annular projection or flange 16 which is interrupted at 17 and is provided with an offset bend 18 adjacent to the opening provided by the space 17 in order to provide a cam surface for a projection 19 of the pawl 12. The pawl 12 is pivotally supported on a pin 20 and operates in such a plane that it does not interfere with the star wheel 17 but serves, not only to accentuate the various positions of the reversing drum 2, but also to provide an interlock between the drums 1 and 2 by engaging the annular flange 16.

The reversing drum 2 is adapted to occupy two principal positions; the forward position, which depends on the engagement of the projection 11 with a notch 21 of the star wheel 10, and a reversing position which depends upon the engagement of the projection 11 with a notch 22. As clearly shown in Fig. 3, when a forward position is occupied by the reverse drum, the main drum 1 may be rotated from its off position to a complete series of positions until finally a tooth 24 of an arm 23, is moved into a notch 25 in a plate or disk segment 26 with which the reversing drum is provided. The further rotative movement of the main drum from the next-to-the-last to its final running position produces a rotative movement of the reverse drum into the position shown in Fig. 4, the projection 11 of the pawl 12 following the periphery of the star wheel 10 from notch 21 to a notch 27.

The bottom of the notch 27 is much farther from the center of the cam than the bottom of the notch 21 and, consequently, the pawl 12 is moved in opposition to the spring 13, so that its projection 19 engages the offset bend 18 in the annular flange 16 and locks the main drum against further movement in the same direction. The projection 11 now accentuates the auxiliary forward position of the reverse drum in which a field control of the motors, governed by the controller, is effected.

When the reverse drum occupies its intermediate off position and the projection 11 engages notch 28 of the cam 10, the projection 19 of the pawl 12 is moved into the space 17 in the annular flange 16 and positively locks the main drum 1 against operation in either direction from its off position.

The projections 29 of the star wheel or cam 10, which are adjacent to the notch 28, are sufficiently prominent to prevent the adjustment of the reversing drum from either its forward or its reverse position into its off position, except when the main drum occupies its off position. It is, therefore, impossible to interrupt the motor circuit at the contact segments of the reversing drum. When the main drum occupies its off position and the reversing drum is thrown to its off position, it is impossible to adjust the main drum until the reversing drum has been moved either to its forward or to its reverse position. It is impossible to adjust the reversing drum to weaken the motor fields until the main drum occupies its next-to-the-last or final position.

The plate or disk segment 26 is provided with a notch 30 which corresponds to the notch 25 and is so located as to be engaged by the tooth projection 24 of the arm 23 when the main drum is moved into its final position, and the reverse drum occupies its reverse position, in which the projection 11 engages notch 31 of the cam 10. The reverse drum is thus actuated in the same direction to effect the field-changing connections irrespective of the prior position of the drum.

The utility of the invention and its application for the control of a plurality of railway motors is indicated by the diagrams of Fig. 6, to which reference may now be had.

As shown in the diagrams, energy is supplied to electric motors, 32, 33, 34 and 35, from line conductor 36, through a controller of the drum type having a main drum 1 and a reversing drum 2 and the mechanical structure illustrated in Figs. 1 to 5 of the drawings. As here shown, the main drum is adapted to occupy a plurality of positions $a$ to $i$ inclusive, and the reverse drum is adapted to occupy positions $x$, $y$, $z$ and $w$, and an intermediate "off" position.

The motors are shown as arranged in pairs 32 and 34 and 33 and 35, respectively, the motors of each pair being connected in parallel relation. The motors 32 and 34 are reversed with respect to each other at all times, this method being necessary when the motors are inside-hung with respect to the truck. However, it will be understood that any other suitable arrangement and location of motors may be employed. The forward and the reverse position of the reverse drum are respectively indicated by the letters $x$ and $w$, while the corresponding field-changing positions are designated by $z$ and $y$. It should be noted that, contrary to usual custom, the reverse position $w$ is not located next to the off position. The reason for this novel arrangement will be obvious from the fact that the main drum always actuates the reverse drum in the same direction to the corresponding field-changing position, irrespective of the prior position of the reverse drum, as hereinbefore mentioned. Although the reverse drum, when in the off position, must pass through the position $y$ to reach the reverse position $w$, no harm is done, since the main drum must occupy its off position, thereby rendering "dead" all reverse-drum contact members, to permit of such actuation, as already pointed out.

Assuming that the reverse drum occupies position $x$, as indicated in the diagram, if the main drum is moved into position $a$, circuit connections are established as follows: From line conductor 36, through trolley 37, conductor 38, contact finger 39, contact segments 40 and 41, contact finger 42, resistor section 43, contact finger 44, contact segments 45 and 46, contact finger 46ª and conductor 47, from which point circuit is completed in two branches, one through armature 48 of motor 32, conductor 50, contact fingers 51 and 51ª which are bridged by contact segment 52, conductor 53, field magnet winding 54 of motor 32, conductor 55, contact finger 56 to contact segment 57. The other branch is completed through armature 49 of motor 34, and field magnet winding 58 of motor 34 to contact finger 60 which engages contact segment 57. Circuit is continued from the contact segments 57, through finger 61, conductor 62, resistor sections 63, contact finger 64, contact segments 65 and 66 to conductor 67, circuit being completed from this point in two branches, one through armature 68 and field magnet winding 69 of motor 33, and the other through armature winding 70 and field magnet winding 71 of motor 35, the two branches being joined and completed through conductor 72 to ground. The four motors are thus arranged in two groups of two motors each, connected in series relation, the motors of each group being in multiple relation. As the main drum successively occupies positions $b$ to $e$, the resistor sections 43 and 63 are gradually excluded from the circuit and, when the drum occupies position $f$, the four motors are arranged in multiple relation with the resistor sections reinserted. The resistor sections are again excluded as the controller occupies positions *g* and *h*. Finally, as the controller is moved from position *h* to position *i*, an adjustment of the reverse drum is effected, as pointed out with reference to the Figs. 1 to 5 of the drawings, from position *x* to position *z*.

Assuming that the reverse drum occupies position *z* and that the main drum occupies position *i*, circuit is completed as follows: From conductor 38 to contact fingers 39 and 73, from finger 73 to contact segments 74 and 75, circuit being completed from segment 74 through segment 76, and finger 77 to conductor 67, from which point it divides and is completed through motors 33 and 35 in multiple. Circuit is also completed from contact segment 75, through segment 46 and finger 46ª to conductor 47, from which point it divides and is completed through motors 32 and 34 in multiple circuit. Each of the four motor circuits is similarly completed to ground and only one of them will be traced through the motor 32, as follows: From conductor 47, through armature 48, conductor 50, contact fingers 51 and 78, which are bridged by contact segment 52, conductor 79 which is tapped into an intermediate point in the field magnet winding 54, a portion of the field magnet winding 54, conductor 55, contact fingers 56 and 61, which are bridged by contact segment 57, conductor 62, contact finger 80, contact segments 81, contact fingers 64 and 82, contact segments 83, contact finger 84, which is connected to ground. It thus appears that, when the reversing drum occupies position *z*, the motors operate with only a portion of the field magnet windings active and, consequently, at an increased speed. This is also true when the reversing drum is moved from position *w* into position *y*. Attention is directed to the fact that contact finger 51ª and the corresponding field magnet winding terminal contact fingers move out of engagement with the coöperating bridging contact segments when the reverse drum is adjusted into position *z*, and, consequently, the inactive portions of the field magnet windings are open-circuited. This is important, since it insures stability of operation for the motors. However, the arrangement is such as to momentarily shunt the turns of the field magnet winding before they are open-circuited, in order to avoid interrupting the motor circuit.

Variations in size and arrangement of parts and in the circuit connections illustrated may be effected within the spirit and scope of my invention.

I claim as my invention:

1. An electric circuit controller comprising a resistance-controlling drum, a reversing drum adapted for field control, and interlocking means whereby a predetermined adjustment of the reversing drum is effected in moving the resistance-controlling drum into its last position.

2. An electric circuit controller comprising a voltage-controlling drum, a combined reversing and field-controlling drum, means for controlling a field winding through the last-mentioned drum, and means for interlocking said drums.

3. An electric circuit controller comprising a voltage-controlling switch, a reversing switch, means dependent upon the position of the voltage-controlling switch for actuating the reversing switch and means dependent upon the said actuation of the reversing switch for effecting a field control.

4. A control system comprising a plurality of electric motors, a series-multiple controlling switch therefor, a reversing switch adapted to weaken the motor fields, and means for effecting the necessary adjustment of the reversing switch to weaken the motor fields when the series-multiple switch is moved into its final position.

5. An electric circuit controller comprising a resistance-controlling switch, a reversing switch adapted for field control, and interlocking means whereby a predetermined adjustment of the reversing switch is effected in moving the resistance-controlling switch into its last position.

6. In a control system, the combination with an electric motor having an armature and a field-magnet winding, of a contact-making member for effecting a reversal of the electrical relations of the armature and field winding, a second contact-making member for effecting acceleration of the motor to a predetermined point, and conducting means movable with said reversing member for subsequently weakening the motor field to produce further acceleration.

7. In a control system, the combination with an electric motor having an armature and a field-magnet winding, of a controller comprising a switching device for effecting acceleration of the motor to a predetermined point, and a second switching device having circuit connections for effecting forward or reverse running of the motor and for independently changing the field strength thereof to effect further acceleration in either direction of operation of the motor.

8. An electric circuit controller comprising a main drum and a second reversing and field-control drum severally adapted to assume a plurality of operative positions, a star wheel secured to said main drum and provided with an annular flange having an offset bend, a cam secured to said second drum and having a notched periphery, a pawl interposed between said cam and said flange to prevent simultaneous movement of said drums except when said pawl registers with said offset bend, a notched plate member secured to said second drum, and a cooperating arm secured to said main drum to effect simultaneous movement of the drums for a single step when they occupy predetermined relative positions.

In testimony whereof, I have hereunto subscribed my name this 4th day of Nov., 1911.

LYNN G. RILEY.

Witnesses:
E. W. STULL,
B. B. HINES.